July 23, 1940.  W. R. GRISWOLD  2,208,724
BEARING
Filed Dec. 5, 1936
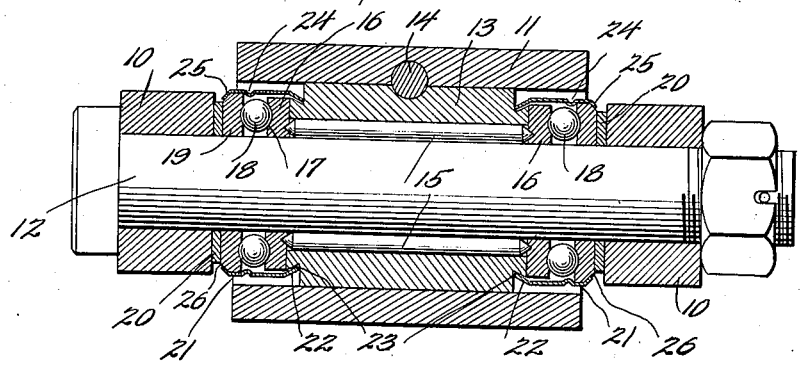
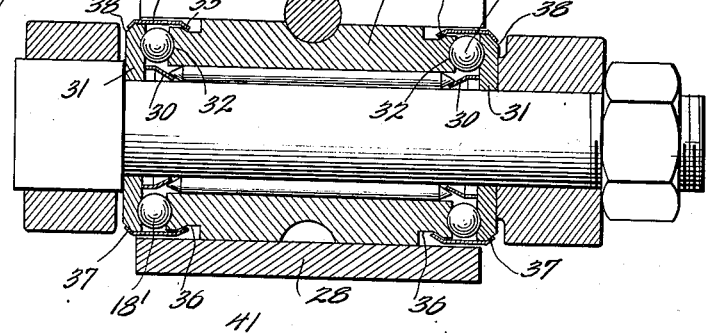
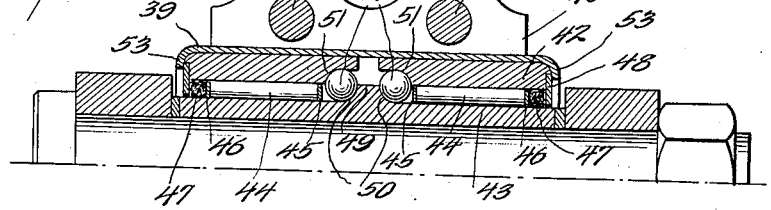
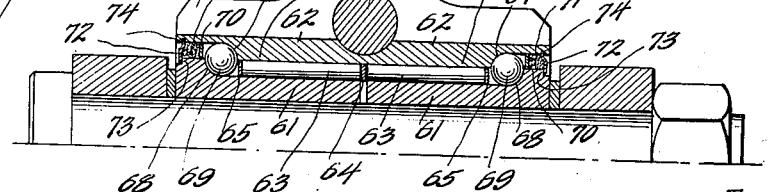
Inventor
WALTER R. GRISWOLD
By Watson, Coit, Morse & Grindle
Attorney Patented July 23, 1940

2,208,724

UNITED STATES PATENT OFFICE 2,208,724

BEARING

Walter R. Griswold, Detroit, Mich., assignor to Packard Motor Car Company, Detroit, Mich., a corporation of Michigan Application December 5, 1936, Serial No. 114,515

10 Claims. (Cl. 308—174)

This invention relates to shaft bearings for general application, and particularly to bearings for use in connection with relatively rotatable members between which both lateral effort and longitudinal effort or end thrust are to be communicated.

One object of the present invention is the provision of a bearing unit comprising a roller bearing and one or more ball bearings in combination, the roller bearing being adapted to transmit transverse effort and the ball bearings being adapted primarily to transmit longitudinal effort or end thrust, the respective bearings being maintained in fixed longitudinal and lateral relation to each other.

Another object is the provision of a combined roller and ball bearing adapted for complete assembly before installation. That is, the combined bearing of the present invention is adapted to be assembled as a unit entirely apart from the members to which it is to be applied, and may thus be conveniently shipped and handled, in contradistinction to bearings comprising a multiplicity of separate parts which are necessarily assembled at the time of installation of the bearing, and accordingly require separate handling theretofore.

A further object is the provision of a combined roller and ball bearing of improved design and capable of convenient and inexpensive manufacture.

Other and further objects, features and advantages will appear from the description which follows, together with the accompanying drawing, in which:

Figure 1 is a longitudinal section through a bearing constructed in accordance with the present invention;

Figure 2 a longitudinal section through a bearing of somewhat modified form;

Figure 3 is a longitudinal section through the upper half of a bearing embodying a further modification of the present invention; and Figure 4 is a view similar to Figure 3 illustrating a still further modification of the present invention.

In order to facilitate an understanding of the invention, reference is made to the embodiments thereof shown in the accompanying drawing and detailed descriptive language is employed. It will, nevertheless, be understood that no limitation of the invention is thereby intended and various changes and alterations are contemplated such as would ordinarily occur to one skilled in the art to which the invention relates.

Inasmuch as the bearing of the present invention is, in each case, symmetrical with respect to a central perpendicular plane, it will be sufficient to describe one end of the bearing only, it being understood that the other end is constructed in an identical manner.

Although the present bearing may be employed in a great variety of applications, for purposes of illustration it is shown and described as applied between the arms 10 of a yoke, and a sleeve 11 comprising a bearing recess of the machine in which the bearing is to be installed. The bearing is secured between the yoke arms 10 by means of a bolt 12 or other suitable means, and comprises a roller race 13 secured to the sleeve 11 by suitable means such as a pin 14. A plurality of rollers 15 are disposed between the race 13 and the bolt 12, and are retained against lateral and longitudinal displacement by roller retaining rings 16 which loosely engage the respective ends of the rollers 15. Each retaining ring 16 is provided with a ball race 17 formed upon its outer face. A plurality of balls 18 are associated with the ball race 17, and are retained in place by ball retaining rings 19. If desired, washers 20 may be interposed between the latter and the arms 10 of the yoke.

Each ball retaining ring 19 is secured in fixed lateral and longitudinal relation to the roller race 13 by means of an annular member 21. The latter is provided with an inwardly projecting flange 22 which loosely engages a groove 23 formed in the roller race 13, and, at its opposite edge is provided with an inwardly projecting flange 25 which engages the bevelled edge 26 of the ball retaining ring 19. Preferably, the member 21 is also provided with an annular projection 24, which engages the opposite edge of the ball retaining ring 19.

The above described combination roller and ball bearing may be assembled as a unit, entirely apart from the sleeve 11 and bolt 12, the assembling operations being as follows:

The annular members 21 are first applied to the roller race 13, the flanges 22 being spun inwardly into the grooves 23. The rollers 15 are then positioned within the roller race 13 and the roller retaining rings 16 applied. The balls 18 are then positioned in the ball races 17 and ball retaining rings 19 applied, after which the flanges 25 of the annular members 21 are spun inwardly into engagement with the bevelled edges 26 of the rings 19, thus locking the entire structure together.

In order to install the bearing unit in a structure such as that illustrated in Figure 1, it is only necessary to insert it bodily into the sleeve 11 and secure it therein by means of the pin 14, after which the arms 10 of the yoke may be positioned opposite the ends of the bearing unit and the bolt 12 inserted, the washers 20 being applied as the bolt is passed through the structure.

In the modification illustrated in Figure 2, the bearing is shown as installed in a split sleeve 28, the latter being clamped upon the roller race 33 by means of a bolt 29. In this form of the invention, the roller retaining rings 16 of the previous form are replaced by roller retaining rings 30 of frusto-conical form. Ball races 32 are formed directly upon the end faces of the roller race 33, and balls 18' are maintained in position by ball retaining rings 31. The latter are secured to the roller race 33 by means of annular members 34, which latter are provided with flanges 35 engaging grooves 36 in the outer face of the roller race 33, and flanges 37 engaging the bevelled edges 38 of the ball retaining rings 31.

In the assembly of the bearing unit just described, the annular members 34 are first applied to the roller race 33 in the manner already described, after which the rollers are inserted and the retaining rings 30 applied. The balls 18' are then positioned in the ball races 32 and the ball retaining rings 31 applied, after which the flanges 37 are spun down upon the bevelled edges 38 of the ball retaining rings 31.

Installation of the bearing may be accomplished in the manner described in connection with the form illustrated in Figure 1.

In the modification illustrated in Figure 3, the roller race is divided into two symmetrical parts, comprising, in effect, two roller races 42. A sleeve 43 is disposed within and concentric with the roller races 42, rollers 44 being disposed between the races 42 and sleeve 43. Washers 45 and 46 are preferably provided adjacent the respective ends of the rollers 44, and if desired, packing rings 47 may be disposed outwardly of the washers 46, the packing rings 47 being maintained in place by rings 48. The inner ends of the roller races 42 are provided with oppositely disposed ball races 51, and the sleeve 43 is formed with an annular projection 49 affording oppositely disposed ball races 50. A plurality of balls 52 are provided between each pair of opposed ball races 50 and 51. An outer casing 39 surrounds the roller races 42, and is provided with inwardly projecting flanges 53 which engage the respective retaining rings 48.

In assembling the present form of the invention, the balls 52, washers 45, rollers 44, washers 46 and packing rings 47 are positioned, in that order, upon the sleeve 43. The roller races 42 are then put in place and the casing 39 applied, after which the flanges 53 are spun inwardly into engagement with the retaining rings 48, thus securing the various members in their operative relationship. In this instance, as in the case of the modification illustrated in Figure 2, the bearing is shown as installed in a split sleeve 40, which is adapted to be clamped about the casing 39 by means of bolts 41. Installation is accomplished in the manner previously described.

In the modification illustrated in Figure 4, the roller races 61 are disposed inwardly of the rollers 63, and the sleeve 62 outwardly thereof, the latter being clamped in a split sleeve 55 by means of a bolt 60. The two groups of rollers 63 are separated by a space ring 64, washers 65 being provided between the outer ends of the rollers 63 and the balls 69. The latter are disposed between ball races 67, formed upon the outer ends of the thickened portion 66 of sleeve 62, and opposed ball races 68 formed adjacent the outer ends of the respective roller races 61. As in the previous modification, washers 70 and packing rings 71 are preferably provided adjacent the ends of the bearing, the packing rings 71 being maintained in place by retainer rings 72. In the present case, the latter rings are utilized for securing the several elements of the bearing unit together in operative relation. The rings 71 are formed of spring material and are split, in order that they may be inserted in grooves 74 formed in the inner face of the sleeve 62 adjacent its respective ends, the inner edges of rings 72, when in place, engaging shoulders 73 formed in the outer ends of the respective roller races 61.

In assembling the present form of bearing unit, the space ring 64, rollers 63, washers 65, balls 69, washers 70 and packing rings 71 are applied, in that order, within the sleeve 62. The roller races 61 are then inserted, and the retainer rings 72 applied by first compressing them to permit of their insertion into the sleeve 62 and into engagement with the shoulders 73, and then permitting them to expand into the grooves 74. As in the case of the previous modifications, the various elements of the bearing unit thus assembled are maintained in operative relation, and may be handled and installed as a unit.

Having thus described the invention, what is claimed as new and desired to be secured by Letters Patent is:

1. A bearing unit comprising a cylindrical roller race, a plurality of rollers disposed within said race, means for retaining said rollers against longitudinal and lateral displacement, ball bearings associated with the respective ends of said race, and means enclosing each of said ball bearings and an end of said race and securing said ball bearings and roller race in fixed longitudinal and lateral relation.

2. A bearing unit comprising a cylindrical roller race, an annular ball race disposed at an end of said roller race, a plurality of balls associated with said ball race, an annular member for retaining said balls in association with said ball race, said ball race being spaced from said annular member by means of said balls, said annular member and said ball race forming the sole support for said balls, and an annular member engaging and securing said roller race and said ball retaining member in fixed longitudinal and lateral relation.

3. A bearing unit comprising a cylindrical roller race, a plurality of rollers disposed within said race, means retaining said rollers against longitudinal and lateral displacement, said means affording a ball race adjacent the end of said roller race, a plurality of balls associated with said ball race, an annular member for retaining said balls in association with said ball race, said ball race being spaced from said annular member by means of said balls, said annular member and said ball race forming the sole support for said balls, and means embracing said roller race and said ball retaining member and securing them in fixed longitudinal and lateral relation.

4. A bearing unit comprising a cylindrical roller race, a plurality of rollers disposed within said race, means at each end of said roller race for retaining said rollers against longitudinal and lateral displacement, said means affording ball races adjacent the respective ends of said roller race, a plurality of balls associated with each said ball race, annular members for retaining said balls in association with said ball races, and means embracing and securing each said ball retaining member in fixed lateral and longitudinal relation with said roller race.

5. A bearing unit comprising a cylindrical roller race, a plurality of rollers disposed within said race, means retaining said rollers against longitudinal and lateral displacement, a ball race formed in the end of said roller race, a plurality of balls associated with said ball race, an annular member for retaining said balls in association with said ball race, and means engaging and securing said roller race and said ball retaining member in fixed longitudinal and lateral relation.

6. A bearing unit comprising a cylindrical roller race, a plurality of rollers disposed within said race, means at each end of said roller race for retaining said rollers against longitudinal and lateral displacement, ball races formed upon the respective ends of said roller race, a plurality of balls associated with each said ball race, annular members for retaining said balls in association with said ball races, and means engaging and securing each said ball retaining member in fixed lateral and longitudinal relation with said roller race.

7. A self-contained combined radial and thrust bearing assembly adapted to be handled, applied and removed as a unit, comprising a roller race having a cylindrical surface, a plurality of rollers disposed adjacent said cylindrical surface, means contacting the ends of said rollers and adapted to retain them against longitudinal displacement, an annular ball thrust bearing at an end of said roller race, said ball thrust bearing including an annular ball race, a plurality of balls, and an annular ball retaining ring, said ball race being spaced from said ring by means of said balls, said ring and said ball race forcing the sole support for said balls and means for securing said roller race and said ball retaining ring in fixed longitudinal and lateral relation, said means comprising a substantially cylindrical sheet metal member a portion of which is spun over a portion of said roller race and another portion of which is operatively connected with said ball retaining ring.

8. A bearing unit comprising a cylindrical roller race, an annular ball race disposed at an end of said roller race, a plurality of balls associated with said ball race, an annular member spaced from said ball race by means of said balls and serving to retain said balls in association with said ball race, and an annular sheet metal member having flanged edges engaging portions of both said roller race and said ball retaining member bridging the space between them and securing them in fixed relation.

9. A self-contained combined radial and thrust bearing assembly adapted to be handled, applied, and removed as a unit, comprising a roller race having a cylindrical surface, a plurality of rollers disposed within said race, a ball race at the end of said roller race, a plurality of balls associated with said ball race, an annular end member spaced from said ball race by means of said balls and serving to retain said balls in said race, an annular member enclosing said end member and said balls and interlocking with the adjacent end portion of said roller race.

10. A self-contained combined radial and thrust bearing assembly adapted to be handled, applied, and removed as a unit, comprising a roller race having a cylindrical surface, a plurality of rollers disposed within said race, a ball race at the end of said roller race, a plurality of balls associated with said ball race, an annular end member for retaining said balls in said race, an annular sheet metal sleeve member enclosing said balls and said ball race and having inwardly spun ends, one of said ends interlocking with a groove in said roller race, and the other embracing a portion of said end member.

WALTER R. GRISWOLD.

CERTIFICATE OF CORRECTION.

Patent No. 2,208,724.                          July 23, 1940.

WALTER R. GRISWOLD.

It is hereby certified that error appears in the printed specification of the above numbered patent requiring correction as follows: Page 3, first column, line 43, claim 7, for the word "forcing" read --forming--; and that the said Letters Patent should be read with this correction therein that the same may conform to the record of the case in the Patent Office.

Signed and sealed this 8th day of October, A. D. 1940.

(Seal)                                                    Henry Van Arsdale,
                                                           Acting Commissioner of Patents.